March 20, 1928.
V. V. COLBY
1,663,267
MEANS FOR CUTTING
Filed Nov. 2, 1922
2 Sheets-Sheet 1
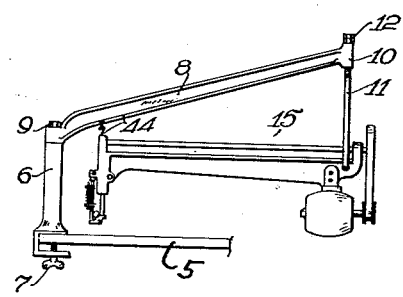
Fig. 1
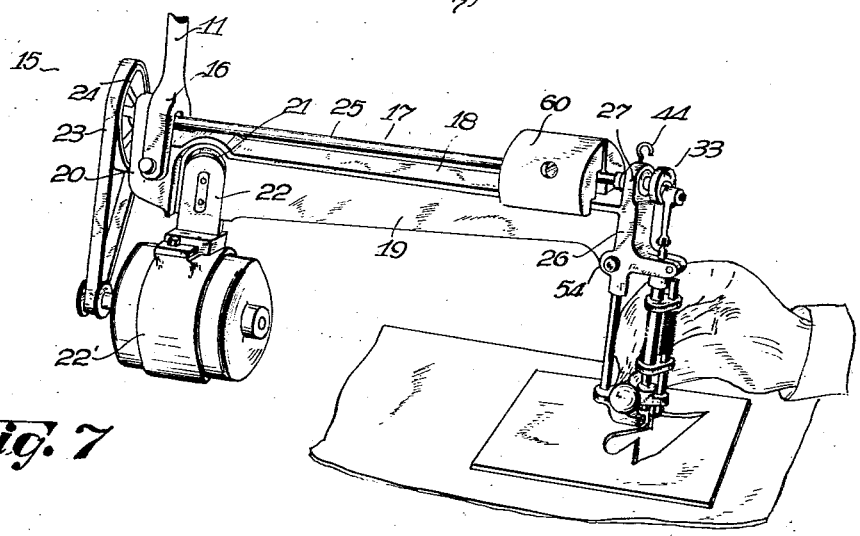
Fig. 2
Fig. 7
Fig. 6
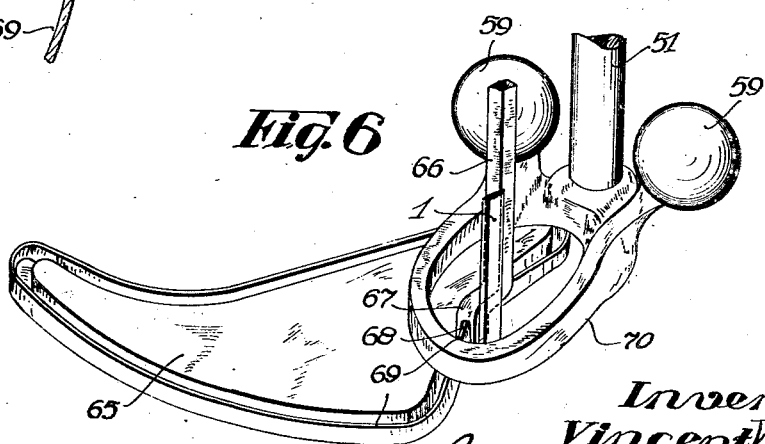
Inventor
Vincent V. Colby
By Brown Boettcher Dienner
Attorneys

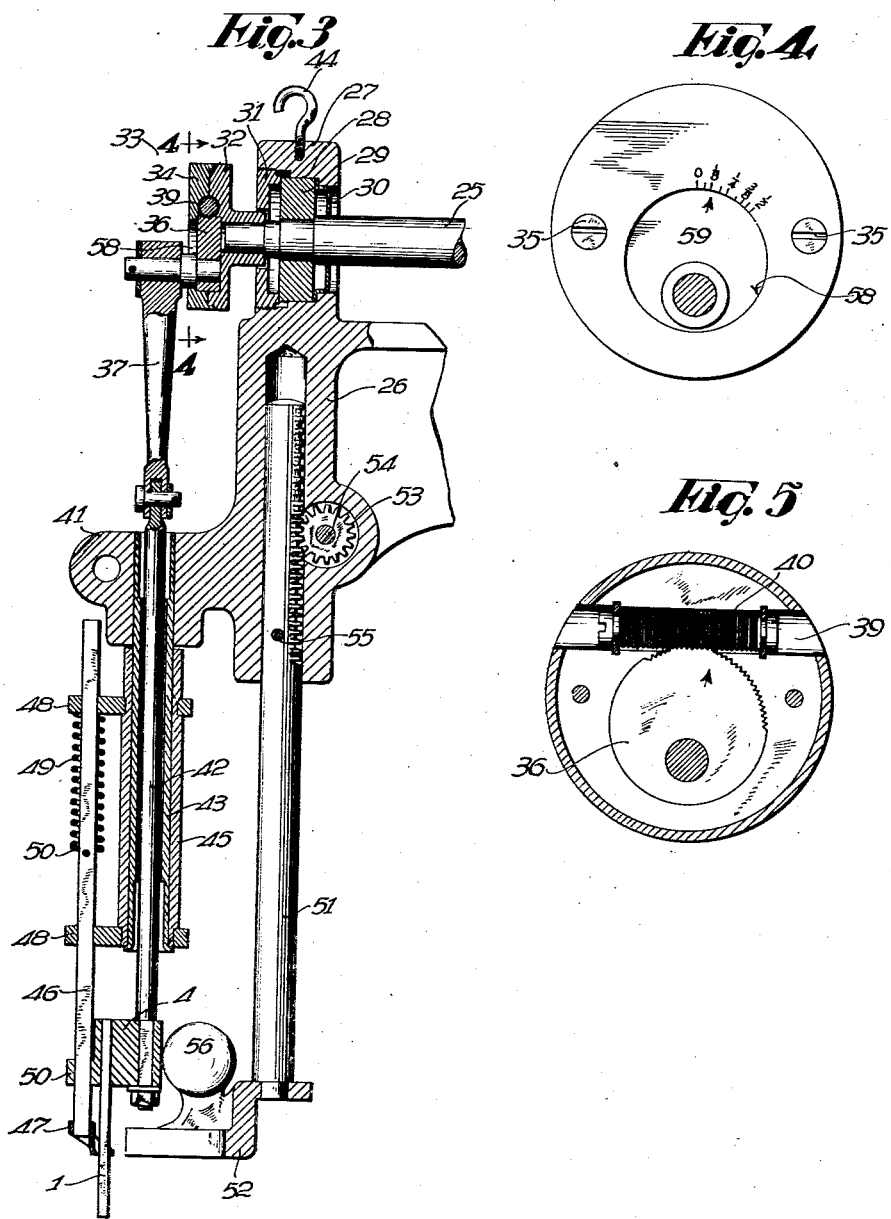

Patented Mar. 20, 1928.

1,663,267

UNITED STATES PATENT OFFICE.

VINCENT V. COLBY, OF CHICAGO, ILLINOIS, ASSIGNOR TO INTERNATIONAL REGISTER COMPANY, OF CHICAGO, ILLINOIS, A CORPORATION OF ILLINOIS.

MEANS FOR CUTTING.

Application filed November 2, 1922. Serial No. 598,688.

My invention relates generally to the manner of cutting out complicated designs from sheet like material, but more specifically to a machine for performing such work.

The cutting of material in sheet like form has heretofore involved much trouble and expense. This is probably due chiefly to the inability of comparatively thin material to hold itself together under the stress of the cutting tool or blade or the means for holding the sheet while on the work table undergoing the cutting operation.

Prior art machines have also given trouble in the form of allowing the effect of tremors and unsteadiness of the operator's hand in guiding the machine over the material, to appear on the cut edge, the cut edge usually being irregular and rough, and requiring a smoothing operation before being finally finished.

It is the aim of my invention to provide a machine which utilizes its weight or inertia for increasing firmness with which the material is held upon the work table, and overcoming the effects of tremors and unsteadiness of the operator's hand in guiding the device.

Another aim is to provide means for evenly distributing the weight of the machine over the material to increase the effective rigidity at a point where there is a tendency for it to be lifted by the cutting action of the blade.

Another aim is to carry adjustably the material engaging element which distributes the machine's weight, so that it will flatly engage with the face of the material and maintain the machine in a position for carrying the blade perpendicular to the line of severance.

Another aim is to provide means for regulating the depth of the cut in terms of the stroke of the blade after said material engaging element has been set.

Another aim is to provide a pressure-foot which will follow the edge of a guide or templet in cutting stock designs of any character. The blade is associated with the pressure-foot, so that it will maintain a fixed position with respect thereto and cut adjacent the edge of the templet in a substantially continuous line conforming to the contour of the guide. The blade and presser-foot are supported to move about an axis parallel to and distanced from the axis of reciprocation of the former, which permits the blade to ride around the guide readily, with its cutting edge advanced.

Further objects and advantages of my invention will become apparent as the description proceeds.

In the accompanying drawing:

Figure 1 is a front elevation of the apparatus embodying my invention, illustrating the manner of positioning the cutter with respect to the suspension arm when not in use;

Figure 2 is an isometric view of the apparatus omitting the suspending arm;

Figure 3 is a vertical section through the tool end of the apparatus;

Fig. 4 is a detail view taken on line 4—4 of Fig. 3 to illustrate the means employed for determining the stroke of the cutting tool;

Fig. 5 is a vertical section taken through the center of the same;

Fig. 6 is an isometric detail of the cutting tool employed in connection with a templet; and Fig. 7 is a bottom plan view of the presser-foot as employed with a templet.

The cutting tool used in the apparatus embodying my invention may vary in construction according to its use and material cut, but in the illustration, the tool 1 is provided with a cutting edge 2 at its end, defined by the intersection of two substantially plane surfaces lying at a much more acute angle to each other than in the ordinary chisel, and merging into a shank 3, which is made as thin as consistent with the necessary strength. The cutting tool 1 is removably but rigidly mounted in a tool supporting head 4 by any suitable means, such as a set screw or tight fitting seat, thus allowing it to be readily removed should it be rendered useless.

In the present construction, the weight of the device is utilized to disseminate and reduce to a minimum the tremors and vibrations in order to obtain a smooth cutting action of the tool while made to follow the pattern or design being cut. The supporting means for carrying the device is in the form of a pivotal suspension, readily attachable to a work table 5 by any suitable device, such as the standard 6 clamped to the edge of the table 5 by clamping means 7. The standard 6 at is upper end carries a radius rod 8, pivoted thereon as by means of a headed pintle 9, secured at its lower end to the standard 6. The outer end of the radius arm 8 terminates in a socket end, receiving a hanger rod 11. Hanger rod 11 slides and rotates freely in the socket sleeve 10, being restrained against downward movement beyond a certain point by a suitable retaining nut 12, threaded on the upper end of the rod. The weight of the apparatus keeps the rod 11 in downward position with the retaining nut 12 against the upper face of the sleeve 10, and consequently, there is no tendency for easy or accidental movement of that end of the frame 15 in an upward direction. Rod 11 terminates in a swivel end 16, preferably having the form of an integral bifurcated end to resemble a downwardly opening clevis. Frame 15 comprises an overhanging arm 17, preferably having a T-shaped cross section, with the base 18 lying horizontally over the web 19, and an enlarged portion 20 which is merely an enlargement of web 19 to the width of base 18. This permits swivel 16 to fork frame 15, and thereby allow vertical end tilting thereof. Directly in front of swivel 16, the groove 21 in web 19 receives plate 22, carrying motor 22', adjustable to put belt 23 under proper driving tension. From the belt 23, power is transmitted through suitable transmission comprising reduction gear 24 and shaft 25, to the tool 1 at the outer end of arm 17. The parts are so arranged that practically all the weight is upon the tool end of the apparatus. The universal suspension allows the projecting arm 17 to be readily moved in any direction, in either a vertical or a horizontal plane. Hook 44 permits the arm 17 to be locked under radius arm 8 when the device is not in use.

The overhanging arm 17 terminates in a vertically disposed enlargement 26 having a cored out bearing lug 27. An annular bearing seat 28 within the lug carries an anti-friction ring 29 supporting the reduced end of shaft 25. The lower portion of the ring's periphery may run in a lubricant, if so desired, as it is housed off at each side by discs 30 and 31. Disc 30 has its edge formed into an inwardly and then upwardly turned flange disposed between the ring 29 and as internal face of lug 27 defining the bearing seat 28, whereby displacement of disc 30 is prevented. Ring 29 is kept pressed against this flange and also on its seat by disc 31, which threads into lug 27. This arrangement excludes all dirt and other foreign matter from coming in contact with the engaging surfaces of ring 29 and its seat 28.

On the end of shaft 25 is fixed a circular plate 32, forming part of an adjustable eccentric 33 for regulating the stroke of tool 1. A second circular plate 34 cooperates with plate 32, being held thereto by any suitable means, as by screws 35. The cored out portion of these two circular plates receives a rotatable disc 36 to which crank arm 37 is pinned. As shown in Figs. 3 and 5, registering grooves 39, each semi-circular in cross section, are provided in each plate 32 and 34 to carry an adjusting element 40 which, in this instance, is a threaded bolt carried to rotate freely without axial shifting. Rotatable disc 36 has a portion of its periphery toothed to mesh with the threads of bolt 40. When a screw driver or other sharp edged tool is inserted in groove 39 to engage the head of bolt 40 for rotation, the disc 36 will either raise or lower crank arm 37.

Plate 34 is provided with a circular opening 58, slightly smaller in diameter than disc 36. A certain portion of the peripheral edge of opening 58 is graduated, and on the exposed face of disc 36 is an indicator 59. Any desired adjustment of the stroke of tool 1 is obtained in the manner just mentioned, and the magnitude is predetermined by indicator 59 registering with the graduations on plate 34.

The enlarged vertical portion 26 is formed with a lug 41 for the support and guidance of plunger 42 and a sleeve 43 encircling the plunger. Lug 41 is split to receive the upper end of sleeve 43 in clamping relation, whereby it is tightly held in its seat. Sleeve 43 preferably extends a substantial way down the plunger 42 to increase the bearing surface, which serves to overcome the tendency of plunger 42 to have angular movement in its vertical reciprocation, due to the eccentric driving connection 33. Lower end of sleeve 43 is turned outwardly to form a seat for the concentrically disposed rotatable presser-head 45, which carries a presser-rod 46 terminating in the foot 47 bifurcated to permit blade 1 to reciprocate therethrough. Preferably two brackets 48 extending from head 45 carry the presser-rod 46 in slidable relation, but is prevented from rotation with respect to the brackets by any suitable means such, for instance, as by forming the rod 46 square. A helical expansion spring 49 connected to stop 50 on rod 46, normally holds the presser-rod and foot in extended position from the blade 1, when the device is not in use. But, when the device is in use, the presser-foot is forced upwardly against the tension of expansion spring 49. The blade 1 is carried on the plunger by means of a block 4 freely rotatable at the lower end of said plunger; and to maintain the blade and presser-foot 47 in alignment, a lug 50 is formed on block 4, through which press-rod 46 slides.

The enlarged vertical portion 26 is socketed to receive a spacer rod 51 which is adjustably held in position so as to control the height of the material engaging shoe 52. A portion of the spacer rod 51 is toothed to mesh with a pinion 53 carried within the enlarged portion 26 and controlled in movement by a thumb bolt 54. After proper adjustment is made, set screw 55 rigidly holds the spacer rod 51 in position. Shoe 52 comprises a pair of curved arms forming a semicircle with the blade 1 and presser-foot 47, both of which lie centrally in the open end of the semi-circle. The curved arms engage the material on either side of the blade, and the gripping balls 56 are disposed to be manually gripped by one or both hands to guide the machine over the work.

As shown in Figs. 2 and 3, in the cutting operation the under side of the material engaging the shoe lies flatly against and parallel to the surface of the material being cut. When moving the tool over the desired line of severance, the shoe 52 engages the material in advance of the tool 1 and presser-foot 47, and thus the weight of the apparatus is upon the material at a point where there is a possible tendency for the tool in its cutting action to disturb the rigidity of the material on the work table. This weight may be increased, if so desired, by means of a weight 60 suitably carried on the base 18 and slidable along the length of the arm 17. The inertia of the mass moving with the tool contributes materially to the smoothness with which the tool may be manually guided; and, slight vibrations due to the unsteadiness of the operator's hand will not be transmitted to the tool because of not being of such magnitude as to disturb the inertia. On the other hand, the ability of the shoe 52 to maintain a flat surface engagement with the material and thereby evenly distribute the weight of the apparatus thereover and adjacent to the advancing edge of the cut, serves to overcome any unsteadiness of the operator's hand.

The adjustment of the stroke of tool 1 is independent of the adjustment of shoe 52. The thickness of the material controls the latter adjustment for the reason, as just explained, that it is preferable for the under side of the shoe 52 to have surface engagement with the material. Assuming that the material is at hand and it is desired to adjust the depth of the cut. The sets crew 55 is loosened and the thumb bolt 54 manipulated until the presser-rod 51 has either lowered or raised the shoe 52 to bring it parallel to and flatly against the material. A sharp edge instrument is inserted in groove 39 to rotate bolt 40 and disc 36 either to raise or lower crank arm 37, which in turn raises or lowers the tool. If the desired depth of the cut is say one-eighth of an inch, the indicator 59 is brought to register with the graduation representing this value. This positively determines the stroke, and hence the cut, and no further adjustment or checking are necessary.

The form thus far explained requires the operator to keep his eye on the work and exercise care in guiding the shoe 52 over the material, but he will find it very easy and simple to draw the cutting tool along the line of severance. The guiding movement of the operator is transmitted through sleeve 43 to presser-head 45, and the tool 1 and presser-foot 49 being freely pivoted on and slightly offset from the axis of the sleeve, the tool 1 will maintain its cutting edge at all times in alignment with the line of movement of sleeve 43. Complicated designs of unlimited variety may be cut by the device at relatively great speed, and while the tool 1 is not in the material during its stroke, the presser-foot remains in contact with the material to prevent accidental rotation of the tool with respect to the sleeve 43.

In cutting a large number of stock designs, I contemplate using a templet 65 in order to obtain an increased output and eliminate the element of skill in choosing the operator to handle the device. Templet 65 is placed upon the material and preferably tacked thereto, although this is not essential as it may be held by other suitable means. Presser-rod 66 terminates in foot 67 having its underside slitted at 68 for riding on the edge 69 of the templet. As will be seen in Fig. 6, presser-foot 67 is offset from the vertical presser-rod 66 and the blade 1 lies opposite or parallel to but at a short distance from this foot. In this instance, the material engaging shoe 70 may form a complete circle, having hand gripping balls 59 thereon. The purpose of a complete annular body for shoe 68 is to insure its engagement with the upper surface of the templet 65, and in turning sharp curves to prevent catching, as would occur by a semi-circular part of shoe 47 dropping off at the side of the templet and ramming its tip against the material.

The slit 68 is enlarged between its ends, preferably having a curved definition, with the widest part in the center of the presser-foot 67. As shown in Fig. 7, in traveling around a sharp curve on the templet's edge, the ends of the slit 68 engage the edge 69, permitting the curved portion of said edge between them to clear the walls of said slit. I prefer operating the blade at a relatively high speed, which permits the presser-foot 67 to ride smoothly along the edge 69. The line of severance conforms to the contour of the templet 65, but the portion cut will be slightly larger, as the blade operates parallel to and at a small distance away from the presser-foot 67. The cutting velocity of the blade is preferably quite high, so that the blade may work its way around the templet with ease, and leaves a smooth line of severance, having no ridges nor other irregularities that would require a smoothing operation.

It is to be noted that the blade and presser-foot are free to swing on their support about the axis of reciprocation of plunger 51. This has particular novelty in connection with the use of the present construction of templet, or in fact any construction desirable, as it permits designs of great variety to be used, having curves or angular deviations of considerable degree without hampering the ease with which the presser-foot 67 can follow the edge of the templet, and the smoothness of the cut made by the reciprocating blade.

While I have described my invention in detail in this particular embodiment, it is clearly apparent that the features of my invention may be incorporated in various and many ways in machines performing analogous and also similar functions; and hence I do not intend to limit myself to the construction and arrangement shown.

I claim:

1. In combination, an arm mounted at one end for movement about a vertical axis, a second arm connected at one end to the other end of the first arm and movable independently thereof about a vertical axis and a horizontal axis, a member depending from the other end of said second arm for travel upon material to be cut, and cutting means associated with said member.

2. In combination, an arm mounted at one end for movement about a vertical axis, a hanger rod extending through the other end of the arm and having its downward movement positively limited, said rod being vertically disposed and loosely mounted for free turning movement, a second arm pivotally mounted at one end on the rod for movement about a horizontal axis, a member depending from the other end of the second arm for travel upon material to be cut, and cutting means associated with said member.

3. In combination, a standard, means for securing the standard to a work support, an arm mounted at one end on the upper end of the standard for movement about a vertical axis, a second arm suspended at one end from the other end of the first arm and movable about a vertical axis and about a horizontal axis, a member depending from the other end of the second arm for travel upon material to be cut, and cutting means associated with said member.

4. In combination, an arm mounted at one end for movement about a vertical axis, a second arm connected at one end to the other end of the first arm for movement about a vertical axis and about a horizontal axis, a member depending from the other end of the second arm for travel upon material to be cut, cutting means associated with said member, and a weight member mounted upon the second arm and adjustable toward and away from the axis of horizontal movement thereof.

5. In combination, an arm mounted at one end for movement about a vertical axis, a second arm depending at one end from the other end of the first arm and movable about a vertical axis and about a horizontal axis, a member depending from the other end of the second arm for travel upon material to be cut, cutting means associated with said member, and a weight member mounted upon the second arm and adjustable toward and away from the axis of horizontal movement thereof.

6. In combination, an arm mounted at one end for movement about a vertical axis, a second arm depending at one end from the other end of the first arm and movable about a vertical axis and about a horizontal axis, a member depending from the other end of the second arm for travel upon material to be cut, cutting means associated with said member, a motor mounted on the second arm between the depending member and axis of the horizontal movement of said second arm, and driving connections between the motor and the cutting means, said depending member being pressed against the material by the weight of the second arm and the parts carried thereby.

7. In combination, an arm mounted at one end for movement about a vertical axis, a second arm depending at one end from the other end of the first arm and movable about a vertical axis and about a horizontal axis, a member depending from the other end of the second arm for travel upon material to be cut, cutting means associated with said member, a motor mounted on the second arm between the depending member and the axis of horizontal movement of said second arm, driving connections between the motor and the cutting means, and a weight member mounted on the second arm and adjustable longitudinally thereof, said weight member coacting with the motor to apply variable pressure to the material being cut.

8. In combination, a reciprocatory tool support, a tool on said support for cutting material to conform to the shape of a guide, said guide having a track along the edge thereof, and means carried by said tool for engaging said track for guiding said tool over the material.

9. In combination, a reciprocatory tool support, a tool on said support for cutting material to conform to the shape of a guide, said guide having a groove within its body portion but adjacent to its edge, and means carried by said tool and having a portion thereof arranged to ride in said groove for guiding said tool over the material.

10. In combination, a reciprocatory tool support, a tool on said support for cutting material to conform to the shape of a guide having a marginal flange, and means carried by said tool for guiding it over the material, said means having its lower end formed to ride the guide flange.

In witness whereof, I hereunto subscribe my name this 31st day of October, 1922.

VINCENT V. COLBY.